United States Patent [19]

Choi et al.

[11] Patent Number: 4,582,867

[45] Date of Patent: Apr. 15, 1986

[54] COATING COMPOSITION AND COATED ARTICLES

[75] Inventors: Jae H. Choi, Warren Township, Marion County, Ind.; John J. Mottine, Jr., Red Bank Township, Monmouth County, N.J.; Walter J. Sparzak, Sr., Catonsville; William C. Vesperman, Bel Air, both of Md.

[73] Assignees: AT&T Technologies, Inc., Berkeley Heights; Bell Telephone Laboratories, Murray Hill, both of N.J.

[21] Appl. No.: 389,328

[22] Filed: Jun. 17, 1982

Related U.S. Application Data

[62] Division of Ser. No. 222,440, Jan. 5, 1981, Pat. No. 4,346,145.

[51] Int. Cl.[4] .................... C08K 5/49

[52] U.S. Cl. .................... 524/115; 524/109

[58] Field of Search .................... 524/115, 109

[56] References Cited

U.S. PATENT DOCUMENTS

| | | | |
|---|---|---|---|
| 2,349,413 | 5/1944 | Hemperly | 174/125 |
| 2,557,089 | 6/1951 | Gamrath et al. | 524/141 |
| 2,668,119 | 2/1954 | Horback et al. | 106/177 |
| 2,843,557 | 7/1958 | Safford | 260/30.6 |
| 2,860,382 | 11/1958 | Garrett | 19/143 |
| 2,892,808 | 6/1959 | Shafer | 260/45.5 |
| 3,037,068 | 5/1962 | Wessel | 174/59 |
| 3,046,237 | 7/1962 | Rosenfelder et al. | 260/23 |
| 3,101,325 | 8/1963 | Swern et al. | 260/30.6 |
| 3,868,341 | 2/1975 | Sauer et al. | 260/23 XA |
| 3,931,091 | 1/1976 | de Radzitsky d'Ostrowick | 260/966 |
| 3,941,908 | 3/1976 | Valia et al. | 428/379 |
| 3,953,650 | 4/1976 | Sauer et al. | 428/389 |
| 3,976,616 | 8/1976 | Combey et al. | 260/30.6 |
| 4,008,368 | 2/1977 | Leuchs | 174/120 |
| 4,207,225 | 6/1980 | Beacham et al. | 260/30.6 R |

FOREIGN PATENT DOCUMENTS

| | | | |
|---|---|---|---|
| 580003 | 7/1959 | Canada | 524/109 |

OTHER PUBLICATIONS

Hawley, G. G.-The Condensed Chemical Dictionary, Eighth Edition, p. 639.

The Merck Index (Ninth Edition) pp. 681 and 880.

*Primary Examiner*—Paul R. Michl

*Assistant Examiner*—Alex H. Walker

*Attorney, Agent, or Firm*—J. F. Spivak

[57] ABSTRACT

A jacketed telephone cord is jacketed with a clear, flame retardant, stable composition which essentially does not exhibit vertical burn characteristics comprising an all phosphate plasticized PVC stabilized with the combination of a metallic stabilizer and a cycloaliphatic epoxy.

6 Claims, 1 Drawing Figure

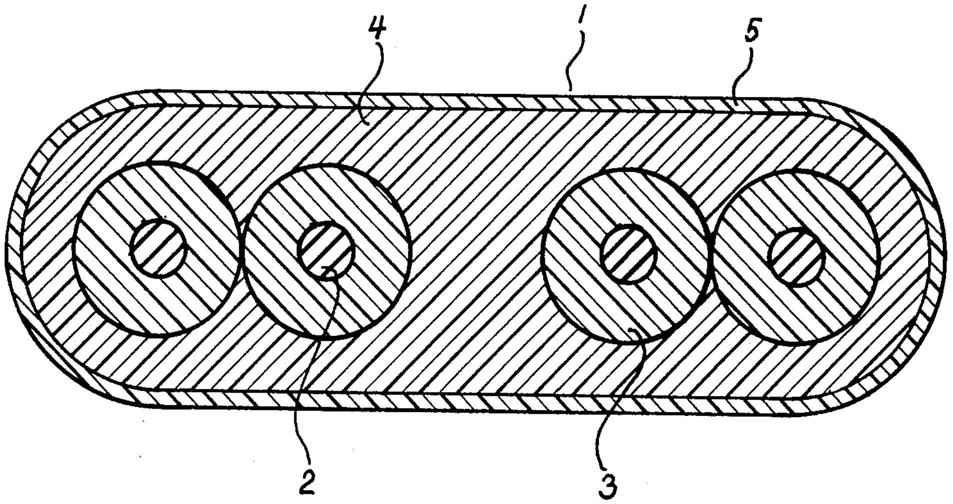
4
1
5
2
3

COATING COMPOSITION AND COATED ARTICLES

This is a division of application Ser. No. 222,440 filed Jan. 5, 1981, now U.S. Pat. No. 4,346,145.

TECHNICAL FIELD

This invention relates to flame retardant polyvinyl chloride compositions, and more particularly, to an extrudable flame retardant polyvinyl chloride composition having low temperature flexibility, high heat and vertical burn stability and high humidity heat aging characteristics to facilitate the use thereof to jacket telephone cordage.

BACKGROUND OF THE INVENTION

Most telephone users are familiar with what is referred to in the art as the line or mounting cord which extends the telephone circuits from a connecting block, either floor or wall mounted, to a telephone set. The telephone set consists of the housing, and the handset which is connected to the housing by a retractile cord. It has been the custom to color match all of the aforementioned telephone components, that is, the line cord, the housing and handset and the retractile cord. Due to the large number of colors and the several different lengths of cords that are available, installers must maintain an uneconomically large inventory of line and spring cords on service vehicles in order to provide the many combinations of length and color. This large mobile inventory results in excessive inventory holding costs.

To reduce the excessive inventory holding costs, studies were made to ascertain if a single color line cord, which would significantly reduce the combinations, could be used. It was determined that this universal color must be neutral in any environment, compliment the telephone set, be aesthetically appealing and be widely accepted by telephone subscribers while also maintaining varied required physical characteristics. At first a satin silver colored polyvinyl chloride (PVC) jacket composition was selected as the universal color for line cords. However, the acceptability for this line cord was less than that which had been hoped for in a sample product test area.

Subsequently, it was decided to field test a line cord having tinned tinsel conductors individually insulated with a clear nylon material and jacketed with a clear PVC jacket. The test showed that a cord of this construction and color had aesthetic appeal as indicated by high acceptance rating in the product test area.

However, although the use of a non-flame-retardant, clear PVC composition solved the question of what universal color the consumer would accept, other problems arose due to the shortcomings of the clear PVC composition that had been employed. One problem that initially had to be overcome was to make a clear PVC composition which was flame retardant. Previously, flame retardation was accomplished by the addition of additives such as antimony trioxide which degraded the clarity of the PVC composition. Furthermore, for the line cord to be acceptable the composition must remain clear, that is, it must not degrade an exposure to ultraviolet radiation. These problems were the subject matter of U.S. Pat. No. 3,868,341. The composition described in that patent consists essentially of at least 80 percent by weight of polyvinyl chloride, 10 to 55 parts by weight per 100 parts by weight of the polymeric material of a phthalate plasticizer, 3 to 50 parts by weight per 100 parts by weight of the polymeric material of a flame retardant phosphate plasticizer, and 2 to 5 parts by weight of a metallic stabilizer together with other materials such as lubricants and ultraviolet absorbers and 1 to 4 parts by weight per 100 parts by weight of polymeric material of an epoxy resin, e.g., Epon ®828, together with 1 to 8 parts by weight of an epoxy plasticizer. This patent also describes, along with the flame retardant composition for line cores, methods of jacketing line cords therewith.

In order to act as a retractile cord, a certain flexibility is needed. The problem of flexibility of the spring cord has been dealt with in the past in U.S. Pat. No. 3,037,068. Other problems such as the tendency of skin oils to cause plasticizers to migrate from a PVC composition have also been dealt with in the art, for example, flexibility, mar resistance and oil migration resistance have been dealt with in U.S. Pat. No. 3,941,908.

A recent standard set for telephone cords is lack of vertical burn while still maintaining improved heat stability generally and in particular high humidity heat aging stability as well as low temperature flexibility, general flame retardation and clarity. It is also desirable to employ a composition which, if one desires, can be pigmented for the manufacture of telephone cordage which match in color to the handset and headset if desired. Vertical burn is tested by placing the telephone cord over a bunsen burner, in accordance with Underwriters Laboratories test UL-62, VW-1. To pass this test the cord should clear without burning.

The development of a suitable composition for jacketing telephone cordage is complicated by all the demands in requirements which telephone cordage must meet and because of the enumerable environments in which telephones are installed. Often, seemingly subtle differences in compositions can make the difference between meeting and not meeting certain requirements or the difference between commercial acceptance and not.

BRIEF DESCRIPTION OF THE DRAWING

The sole FIGURE represents a cross-section of a telephone cord employing the novel jacketing composition of this invention.

SUMMARY OF THE INVENTION

The present invention comtemplates a strand material, e.g., telephone cordage, provided with an insulated covering or the jacket thereover and a novel jacketing composition. The jacketing composition is a char-forming phosphate plasticized PVC composition comprising polyvinyl chloride resin, a plasticizer consisting essentially of 45 to 60 parts by weight per 100 parts of PVC resin of flame retardant phosphate plasticizers, said plasticizer comprising either (a) from 30% to 60% of tributoxyethyl phosphate, (b) from 85% to 100% or 2-ethylhexyl diphenyl phosphate as char-forming components, 4 to 8 parts by weight per one hundred parts PVC of a cycloaliphatic epoxy resin co-stabilizer and 2 to 4 parts by weight per 100 parts of PVC of a metallic stabilizer.

In addition to the above basic components, it is generally preferred in order to meet the commercial requirements of a telephone cordage jacketing composition to include additives such as a lubricant, a UV stabilizer, and an additive to reduce plate-out during extrusion. In addition one may also add a tint, such as a blue tint, to reduce yellowness due to aging and give the normally clear jacketing composition a bluish or water-white appearance, or in the alternative where a colored jacket is required, various coloring pigments or dyes may be added.

DETAILED DESCRIPTION

In the presently contemplated environment for use of the composition embodying this invention, a telephone cord having tinned tinsel conductors insulated with nylon is jacketed with a novel polyvinyl chloride based composition. It should be understood, of course, that while this novel composition was formulated particularly for use in the demanding environment of telephone cordage, the composition is suitable for jacketing or coating other strand materials or articles of manufacture as well. Further, the specific construction of the telephone cordage other than the jacketing material in accordance with the novel composition is not critical.

A typical telephone cord 10 of the type described is shown in FIG. 1. The telephone cord 10 comprises a plurality of adjacent conductors 11 which may be flat or round, each conductor 11 having an electrically insulating coating 12 thereover. Generally, this electrically insulating coating 12 is comprised of a flammable polyester, polyether copolymer, e.g., Dupont Hytrel ®7246 having an oxygen index of 18. The plurality of coated conductors 11 is covered with a jacket 13 comprising the novel char-forming, burn resistant, generally clear phosphate plasticized PVC composition of this invention. The jacket 13 may then be coated with a protective outer coat 14, e.g., a polyester coat comprised of Goodyear ®VAR 5825 polyester resin. This resin is also flammable having an oxygen index of 17. The oxygen index of the novel PVC jacket is generally about 29, but more important is the char-forming characteristic which prevents any exposure and/or burning of the conductor coating resin 12.

The basic polymer which is utilized in the novel composition is a polyvinyl chloride (PVC) resin. The PVC resin has all of the characteristics associated with the homopolymer which includes some abrasion resistance, but which in and of itself is heat unstable. The particular PVC employed for jacketing telephone cordage must be a suitable electrical grade material.

Commercial PVC polymers may contain up to 20 percent or preferably maximum of 10 percent by weight of comonomers or other admixed materials such as propylene. These commercial polymers may be used without significant adverse effect. For example, PVC acetate or PVC propylene may also be used. The PVC resin may be any of a number of PVC resins well known in the art for use as electrical insulation. In accordance with the A.S.T.M. standard for 1966, suitable compounds for use in telephone cordage may be classified as within the range of from GP4-00005 to GP7-00005 inclusive. The definition of these characteristics are set forth in the A.S.T.M. standard under designation DI755-66. The electrical characteristic is, of course, not a basic requirement for other uses from the standpoint of the inventive teaching herein.

For convenience, concentrations of other materials incorporated in the novel composition shall be set forth in terms of part by weight based on 100 parts of the PVC resin. Combined with the polyvinyl chloride resin to facilitate processing, including the extrusion of the composition and, moreover, to provide a flame retardancy for the composition which does not make the composition milky or otherwise degrade its clarity is a flame retardant phosphate plasticizer. The plasticizer which may be a combination of phosphate materials is present in the range of 45 to 60 parts by weight per 100 parts of PVC resin. Examples of suitable flame retardant phosphate plasticizers include a triaryl phosphate such as isopropyl phenyl diphenyl phosphate sold by FMC Corporation under the tradename Kronitex ®100, an alkyl trialkoxy phosphate such as tributoxy ethyl phosphate marketed under the Tradename KP-140 by FMC Corporation, a diaryl phosphate such as tertiary-butyl phenyl diphenyl phosphate available from Monsanto Corporation under the tradename Santicizer ®154, or isodecyl diphenyl phosphate available from Monsanto under the tradename Santicizer ®148 or 2-ethylhexyl diphenyl phosphate available as Santicizer ®141 or a blend of Santicizer ®148 and Santicizer ®154 (70/30) called Santicizer ®143 from Monsanto.

A preferred flame retardant plasticizer composition comprises a mixture of isopropyl phenyl diphenyl phosphate with tributoxyethyl phosphate wherein at least 30 percent of the total phosphate is the tributoxyethyl phosphate. Also, a composition comprised of at least 85% 2-ethylhexyl diphenyl phosphate plus isodecyl diphenyl phosphate is preferred where a higher flame retardant index is required and where added plate-out can be tolerated or plate-out reduced by other means, e.g.,, extruder screw design or other additives.

It should be noted that while it has been known that such phosphate plasticizers act as flame retardants, their use previously was limited to a combination of the phosphate with a monomeric plasticizer such as the phthalate plasticizer. However, we have found that this combination does not result in a composition which can pass the vertical burn test now imposed and if the phthalate was omitted from compositions as taught in the prior art, the stability of the composition was adversely effected, i.e., the composition would prematurely gel or degrade in the extruder.

For particular formulation to be acceptable as a jacketing material for telephone cords, various standards have been set. For example, heat stability of the jacketing material as measured in a Brabender plastic coater at 100 RPM in a 205° C. oil bath should be at least 18 minutes; the low temperature brittleness measured in accordance with A.S.T.M. D-746 should be −15° C. or less; only slight to moderate plate-out is acceptable during extrusion of the composition; and humidity aging at 150° F., 90 percent relative humdity should exceed 7 days with less than a 33 percent loss of clarity. Furthermore, the jacket material must be able to pass the UL-62, VW-1 vertical burn test. As will be shown hereafter, the novel formulations meet these requirements while still maintaining good stability and shelf life. It has been found, however, that formulations using the same ingredients as incorporated in the novel formulations as set forth herein, but wherein the materials are outside the claimed ranges or where phthalate plasticizers are included do not meet these requirements. For example, when the preferred plasticizer composition is employed at a level of only 40 parts plasticizer to 100 parts polyvinyl chloride resin, heat stability is reduced to less than 12 minutes and low temperature brittleness is only about −13° C. Similarly, if the preferred plasticizer mixture is incorpoated at a level of 70 parts total plasticizer per 100 parts polyvinyl chloride resin, heavy amounts of plate-out on the extruded screw is observed and the composition fails the humidity aging test after only eight days. It may be noted that the novel composition is sufficiently oil resistant so as to preclude the exudation of the jacket constituents when in contact with the customers' hands without the addition of a special polymeric plasticizer to accomplish this.

Combined with the PVC and the plasticizers as set forth above is from 4 to 8 parts per hundred parts PVC of a cycloaliphatic epoxy resin and a metallic stabilizer system. We have discovered that this particular type of epoxy resin when coupled with the metallic stabilizer system as described herein together with the PVC and plasticizers in the weight ratios set forth, unexpectedly enhances the properties of the jacket material giving the composition good stability even in the absence of a phthalate plasticizer. The metallic stabilizer system together with the cycloaliphatic epoxy co-stabilizer permits the composition to be extruded without non-uniformity in appearance and prevents discoloration and non-uniformity which, of course, would not be tolerable with telephone subscribers. The addition of the stabilizer also results in a clear composition, the ratios of metal of the composition being maximized to give a clear color with accompanying heat stability. It should be noted that substitution of other types of epoxy resins, such as Shell Epon ®828, derived from diglycidyl ether of bisphenol A does not provide the required stability.

The metallic stabilizer suitable for purposes of this composition may include (1) a metallic stabilizer containing a phosphite chelator, (2) a barium stearate, (3) a cadmium-stearate, (4) a barium-ethyl-hexoate, (5) a barium-cadmium laurate or (6) a barium-cadmium myristate. A metallic stabilizer containing a phosphite chelator includes, for example, a barium-cadmium-zinc phosphite or a barium-cadmium phosphite, the barium-cadmium-zinc phosphite being preferred. The use of these constituents provides long-term heat stability while the chelator, together with the cycloaliphatic epoxy optimizes the effectivness of these constituents and yields a stable formulation which will not prematurely gel or degrade.

The metallic stabilizer may be present in solid form dispersed in a carrier. A preferred carrier may include an organic solvent. This stabilizer may be defined as being an emulsion or suspension of the materials in an organic solvent carrier.

It has been found that a liquid metallic stabilizer has certain advantages. The liquid metallic stabilizer may be added to the compounding mixture together with the other liquid consituents as the plasticizer and other additives to benefit the composition at a very early stage of preparation. This dispersion of metals in an organic solution interacts with the polyvinyl chloride and cycloaliphatic epoxy synergistically is employed to aid the extrusion process and provide stability. The metallic stabilizer system should be added in a range of from 2 to 4 parts per 100 parts PVC resin. In the novel composition, less than 2 parts result in a reduction of heat stability while more than 4 parts of the stabilizer increases metal plate-out during extrusion. One such barium-cadmium-zinc phosphite stabilizer which has been found suitable for purposes of practicing the novel invention is known as 6079W and is available commercially from Ferro Chemical Corporation. This material contains a phosphite chelator and barium octanoate, cadmium octanoate and Zn octanoate. Typically, the metals in the stabilizer are present in the following weight percents: Ba, 1.9–3.9%; Cd, 2.2–4.2%; Zn, 0.2–0.9%. In addition, phosphorous is present in a weight percent range of from 1.5–4.2 and the stabilizer generally contains from 0.05–0.15 weight percent bisphenol A. A preferred metallic stabilizer contains 2.9% Ba, 3.2% Cd, 0.3% Zn, 2.2% P and 0.1% bisphenol A.

The co-stabilizer or cycloaliphatic epoxy is present in the formulation in the range of 4–8 parts per 100 parts PVC. The preferred epoxy, 3,4-epoxycyclohexylmethyl-3,4-epoxycyclohexane carboxylate, is available from Union Carbide as ERL-4221 resin and has an epoxy equivalent weight of 131 to 143 and the molecular weight of about 252.

It has been discovered, for example, that if one substitutes in the preferred formulation an epoxy resin other than the cycloaliphatic epoxy resin included in the present invention, the heat stability of the composition decreases nearly by a factor of 2 and the humidity aging characteristics decrease by a factor of more than 2. These dramatic changes in heat stability and aging characteristics as a function of epoxy type are not observed in formulations employing other plasticizers. For example, in a phthalate plasticized PVC formulation, there is no significant difference in a composition which employs a cycloaliphatic epoxy resin as compared with other epoxy resins.

Experiments have also indicated that without the presence of either the tributoxyethyl phosphate as part of the plasticizer composition, in an amount representing 30–60 percent of the plasticizer, or 2-ethylhexyl diphenyl phosphate, in an amount of at least 85% of the plasticizer vertical burn characteristics, plate-out characteristics and low temperature brittleness characteristics do not meet standards set for commercial use.

It is important to use the proper proportion of the cycloaliphatic epoxy in relation to the other constituents of the composition. For example, if less than 4 parts cycloaliphatic epoxy per 100 parts PVC is employed, reduced heat stability is experienced. On the other hand, if greater than 8 parts of the epoxy per 100 parts of the PVC is employed, exudation worsens with humidity.

Combined with the PVC, the plasticizers and the metallic stabilizer may be additional additives such as lubricants, ultraviolet light stabilizers, blue tints to prevent discoloration due to aging, anti-plate-out materials and pigments or dyes for coloration.

Suitable lubricants which may be used in this composition include for example, stearates or a stearic acid. Functionally, the lubricant (1) adds synergistically to the maintenance of the clarity by helping to avoid yellowing, (2) adds to the heat stability of the composition, and (3) provides lubrication of the composition in the manufacturing process. The lubrication of the composition insures that all of the constituents blend together to obtain an homogeneous mix with accompanying reduction of internal friction. The lubricant is also of assistance in causing the composition to be moved onto the extrusion screw, to be melted and to be extruded therefrom in a uniform state with an even flow.

Preferably, a lubricant concentration of from 0.4 to 1.0 parts of lubricant per 100 parts PVC is used. The preferred lubicant is stearic acid in an amount of about 0.6 parts per 100.

In order to provide improved light stability for the inventive composition, an ultraviolet absorber may be combined with the other constituents. The addition of the ultraviolet absorber is of assistance in avoiding ultraviolet degradation such as when the telephone cordage having the inventive composition covering the conductors is exposed to sunlight.

The preferred concentration of the ultraviolet absorber added to the PVC is 0.2 to 0.5 parts by weight per 100 parts by weight of the polymeric material. One family of ultraviolet absorbers which are available and have been found to be acceptable are the substituted benzophenones such as 4-decyl-2-hydroxybenzophenone available as Mark 202A as marketed by the Argus Chemical Company. This material has a melting point of 120° F. and is in the form of a powder having an off-white appearance. When a clear telephone cord is desired, the ultraviolet absorber must be selected so as to provide ultraviolet stability while retaining the clarity of the composition. Where the cordage is to be colored, this requirement need not be met. Other substituted benzophenones which are also acceptable in combination or as a substitute for the Mark 202A includes a 2-hydroxy-4-dodecyloxy benzophenone, a 2-hydroxy-4-N-octoxy benzophenone and bisphenol A. Other families of ultraviolet absorbers known in the art may also be employed.

In order to further enhance ultraviolet stability and to reduce yellowness due to aging, a blue tint toner such as a vinylized tinting agent sold by Voight Corporation under the designation DR-153 may be added to the composition in a weight range of from 0.01 to 0.05 parts of tint to 100 parts PVC.

In order to minimize or eliminate plate-out of the composition on the extruder screw anti-plate-out additives are preferably added to the composition. Such additives, which are known in the art, include silica which is available from Cabot Corporation marketed under the tradename Cab-O-Sil ®. Such inorganic anti-plate materials are typically added in a range of from 0.4 to 0.8 parts per 100 parts PVC. An additional material for the purpose of minimizing or eliminating plate-out which is preferably incorporated in the composition in an amount of from 0.2 to 0.6 parts per 100 parts PVC is partially oxidized polyethylene (POP marketed by NL Industries).

EXAMPLES

The following examples illustrate various clear flame retardant jacketing compositions prepared in accordance with the invention and some which do not fall within the subject invention but are given for the purpose of comparison. In all cases, the structure is that of a conductor such as tinsel conductors with a nylon insulation thereover and jacketed with the stated composition. Examples and test results are set forth in tabular form for convenience and comparison.

TABLE I

| Ingredient | Peferred (parts per hundred) | Range |
|---|---|---|
| PVC | 100 | — |
| *K-100, S-143, S-148, S-154 S-141** | 30 | 18–42 |
| *KP-140 | 20 | 14–36 |
| ERL-4221 | 6 | 4–8 |
| 6079W | 3.0 | 2–4 |
| Stearic Acid | 0.6 | 0.4–1.0 |
| Mark 202A | 0.25 | 0.2–0.5 |
| Partially Oxidized Polyethylene | 0.3 | 0.2–0.6 |
| Cab-O-Sil ® MS-7 | 0.6 | 0.4–0.8 |
| Blue Tint Toner | 0.03 | 0.01–0.05 |

(*Total of these 45-60)
Note:
At least 85% S-141 in combination with S-148 or KP140 or 100% S-141 is an alternate plasticizer preferred system.

Table I provides the preferred embodiment of the novel formulation together with useful ranges of each of the constituents therein. It should be noted that the total phosphate plasticizer employed should be from 45 to 60 parts per 100 parts of PVC resin with the KP-140 being at least 30% of this material or alternately a system which is comprised of at least 85% S141. The formulation should not contain phthalate plasticizer as compositions containing this latter plasticizer do not meet the vertical burn requirements.

TABLE II

| Total Amount of Phosphate in Formulation | Heat Stability (min.) | Plate Out | Low Temp. Brittleness (°C.) | Aging (days) | Vertical Burn (seconds of "after-flame" |
|---|---|---|---|---|---|
| (a) 40 parts (70% K-100 30% KP-140) | 12 (fails) | slight | −13° (fails) | 14 | >200 seconds complete burn fails |
| (b) 45 parts (70% K-100 30% KP-140) | 21 | slight | −15° | 13 | 58 sec. passes |
| (c) 50 parts 30% KP-140) | 24 | slight | −17° | 12 | 43 sec. passes |
| (d) 60 parts (70% K-100 30% KP-140) | 29 | slight | −19° | 10 | 36 sec. passes |
| (e) 70 parts 30% KP-140) | 31 | heavy (fails) | −21° | 5 (fails) | 29 sec. passes |
| (f) 50 parts (85% S-141 15% S-148) | 27 | moderate-slight | −22° | 8 | 19 sec. passes |
| (g) 50 parts (85% S-141 (15% KP-140) | 27 | moderate-slight | −24° | 8 | 20 sec. passes |
| (h) 45 parts | 25 | moderate | −23° | 7 | 9 sec. passes |

TABLE II-continued

| Total Amount of Phosphate in Formulation | Heat Stability (min.) | Plate Out | Low Temp. Brittleness (°C.) | Aging (days) | Vertical Burn (seconds of "after-flame" |
|---|---|---|---|---|---|
| (100% S-141) | | | | | |
| (i) 50 parts (70% S-141 30% S-148) | 24 | moderate- | −22° | 7 | 73 sec. fails |

The examples set forth in Table II employ all of the ingredients set forth in the preferred formulation as given in Table I and the note thereto in the quantities as stated therein except for the variation in the quantity of phosphate plasticizer. Examples (b), (c), (d), (f), (g) and (h) of Table II employ phosphate plasticizers within the allowable ranges of this invention while Examples (a) and (i), and (e) employ amounts of plasticizer below and above the allowable ranges, respectively. The properties of heat stability measured in a Brabender plasticorder, plate-out, low temperature brittleness measured in accordance with A.S.T.M. D-746, humidity aging measured at 150° F. and 90% relative humidity and vertical burn measured in accordance with Underwriters Laboratories designation UL-62, VW-1 were measured for these compositions vertical burn is measured in seconds often five 15 seconds ignitions. A burn of over 60 seconds fails this test. It can be seen that the novel formulations b, c, d, f, g and h all passed the various tests, formulation (a) fails both the heat stability test and the low temperature brittleness test while the formulation represented by (e) fails the plate-out test and the humidity aging test and (a) and (i) fail the vertical burn test. It may be noted that flame retardant compositions based upon $Sb_2O_3$ fails the vertical burn test requirement.

TABLE III

| Epoxy & Plasticizer | Humidity Aging (days) | Heat Stability (min.) |
|---|---|---|
| (a) ERL-4221 & Phosphate Plasticizer (K-100/KP-140) | 12 | 24 |
| (b) ERL-4221 & Phosphate Plasticizer (S-141/S-148) | 8 | 27 |
| (c) Epon ® 828 & Phosphate Plasticizer (K-100/KP-140) | 5 | 14 |
| (d) Epon ® 828 & Phosphate Plasticizer (S-141/S-148) | 4 | 16 |
| (e) Drapex 6.8 & Phosphate Plasticizer (K-100/KP-140) | 3 | 11 |
| (f) Drapex 10.4 & Phosphate Plasticizer (K-100/KP-140) | 5 | 13 |
| (g) ERL-4221 & Phthalate Plasticizer (DOP) | | 31 |
| (h) Epon ® 828 & Phthalate Plasticizer (DOP) | | 29 |
| (i) Drapex 10.4 & Phthalate Plasticizer (DOP) | | 31 |

Table III shows the values of the heat stability in minutes and humidity aging, in days, using the preferred formulations, (a) and (b) and using formulations wherein the cycloaliphatic epoxy resin of the preferred formulation is substituted by another epoxy such as Epon ®828, an epichlorohydrin epoxy resin marketed by Shell Chemical Company [Examples (c) and (d)], or Drapex 6.8, an epoxidized soybean oil marketed by Argus Chemical Company [Example (e)], or Drapex 10.4 an epoxidized linseed oil [Example (f)]. In addition, the table indicates in Examples (g) through (i) the heat stabilities of the various epoxies as set forth above, but substituting for the phosphate plasticizer of the preferred embodiment, namely the combination of K-100 and KP-140, 50 parts of a di-2-ethylhexyl phthalate (designated DOP), a phthalate plasticizer is given. It should be kept in mind that heat stabilities in excess of 18 minutes are required. It can be seen from the table that when other epoxies are substituted for the cycloaliphatic epoxy resin with phosphate plasticizer of the novel composition, heat stabilities are decreased by a factor of nearly 2 and do not pass the heat stability test. Also, while the heat stability is better in the phthalate system, and in that system the particular epoxy resin employed does not tend to change or effect the heat stability obtained, the phthalate plasticized systems fail the vertical burn test required for telephone cordage.

TABLE IV

| Parts Plasticizer | | Vertical Burn (sec.) | Plate Out | Low Temp. Brittleness (°C.) |
|---|---|---|---|---|
| (a) KP-140, K-100, | 20 parts 30 parts | 43 (passes) | slight (passes) | −17 (passes) |
| (b) S-143, K-100, | 20 parts 30 parts | 88 (fails) | slight (passes) | −13 (fails) |
| (c) S-148, K-100, | 20 parts 30 parts | 82 (fails) | slight (passes) | −14 (fails) |
| (d) S-154, K-100, | 20 parts 30 parts | (fails complete burn | slight (passes) | +2 (fails) |
| (e) S-141, S-148, | 45 parts 5 parts | 17 passes | slight-moderate (passes) | −22 (passes) |

This table sets forth results of vertical burn tests, plate-out tests and low temperature brittleness tests for the preferred formulation and formulations wherein other plasticizers replace all of the tributoxyethyl phosphate portion of the preferred plasticizer composition. As can be seen from these results, even when replaced by other phosphate plasticizers, the tributoxyethyl phosphate is a necessary component of the plasticizer composition. It should be kept in mind, however, that these other phosphate plasticizers may be substituted for the K-100 portion of the preferred plasticizer composition, that is, they may replace the isopropyl phenyl diphenyl phosphate. When this is done such that the formulation still contains tributoxyethyl phosphate, the cordage produced from these compositions pass all the required tests. It can therefore be seen that in order to achieve a formulation which results in a jacketing material for telephone cordage which will pass the vertical burn test and still retain good stability while still passing the other of the aforementioned tests, a very delicate balance of materials is required. Example (e) in which S-141 comprises at least 85% of the blend also passes these tests.

What is claimed is:

1. A composition of matter comprising polyvinyl chloride resin, a plasticizer consisting essentially of 45 to 60 parts by weight per 100 parts polyvinyl resin of a char-forming flame retardant phosphate plasticizer, said plasticizer including 30–60% by weight of tributoxyethyl phosphate, or 85–100% by weight 2-ethylhexyl diphenyl phosphate, 4–8 parts by weight of a di-epoxycycloaliphatic carboxylate and 2–4 parts by weight of a metallic stabilizer and wherein said composition is free of phthalate plasticizer.

2. An electrical cord comprising:

(a) a plurality of conductor strands;

(b) an electrically insulating coating of each conductor;

(c) a char-forming, flame retardant phosphate plasticized PVC resin composition jacket over the conductors and coating said composition comprising:

(a') PVC resin; and (b') a plasticizer consisting essentially of 45–60 parts by weight per 100 parts PVC resin of a char-forming flame retardant plasticizer including 30–60 weight percent tributoxyethyl phosphate, 4–8 parts by weight of a compatible di-epoxycycloaliphatic carboxylate and 2–4 parts by weight of a metallic stabilizer.

3. A composition of matter comprising polyvinyl chloride resin, a plasticizer consisting essentially of 45 to 60 parts by weight per 100 parts polyvinyl resin of a char-forming flame retardant phosphate plasticizer, said plasticizer including 30–60% by weight of tributoxyethyl phosphate, 4–8 parts by weight of a di-epoxycycloaliphatic carboxylate and 2–4 parts by weight of a metallic stabilizer.

4. The composition recited in claim 3 wherein said plasticizer includes a diaryl phosphate or a triaryl phosphate.

5. The composition recited in claim 4 wherein said di-epoxycycloaliphatic carboxylate is 3,4-epoxycyclohexylmethyl-3,4-epoxycyclohexane carboxylate and the metallic stabilizer is a phosphite chelator containing barium, cadmium and zinc therein.

6. The composition recited in claim 4 including a lubricant, a U-V light stabilizer and an anti-plate-out additive.

* * * * *

UNITED STATES PATENT AND TRADEMARK OFFICE

CERTIFICATE OF CORRECTION

PATENT NO. : 4,582,867

DATED : April 15, 1986

INVENTOR(S) : J. H. CHOI, J. J. Mottine, Jr., W. J. Sparzak, Sr., W. C. Vesperman It is certified that error appears in the above—identified patent and that said Letters Patent is hereby corrected as shown below:

In the specification, Column 8, Table II,

" (c) 50 parts " should read -- (c) 50 parts --
30% (70% K-100
KP-140 30%
KP-140)

" (e) 70 parts " should read -- (e) 70 parts --
(70% K-100
30% 30%
KP-140 KP-140

" (i) 50 parts 24 moderate" should read
(70% S-141

-- (i) 50 parts 24 moderate- --
(70% S-141 slight

Signed and Sealed this

*Sixteenth* Day of *September 1986*

[SEAL]

*Attest:*

DONALD J. QUIGG

*Attesting Officer* *Commissioner of Patents and Trademarks*